(12) United States Patent
Kucinski et al.

(10) Patent No.: US 8,356,826 B2
(45) Date of Patent: Jan. 22, 2013

(54) SUSPENSION SYSTEM FOR A VEHICLE

(75) Inventors: Robert D. Kucinski, Clay, MI (US);
Mark S. Zmyslowski, Grosse Pointe Shores, MI (US)

(73) Assignee: Radar Industries, Inc., Warren, MI (US)

(*) Notice: Subject to any disclaimer, the term of this patent is extended or adjusted under 35 U.S.C. 154(b) by 0 days.

(21) Appl. No.: 13/353,958

(22) Filed: Jan. 19, 2012

(65) Prior Publication Data

US 2012/0112427 A1    May 10, 2012

Related U.S. Application Data

(63) Continuation of application No. 13/188,097, filed on Jul. 21, 2011, which is a continuation of application No. 12/845,896, filed on Jul. 29, 2010, now Pat. No. 7,997,599, which is a continuation of application No. 11/937,249, filed on Nov. 8, 2007, now Pat. No. 7,793,954.

(60) Provisional application No. 60/952,089, filed on Jul. 26, 2007, provisional application No. 60/945,613, filed on Jun. 22, 2007.

(51) Int. Cl.
*B60G 3/04* (2006.01)

(52) U.S. Cl. ... 280/124.134; 280/124.135; 280/124.145; 280/124.147

(58) Field of Classification Search .......... 280/124.134, 280/124.135, 124.136, 124.142, 124.145, 280/124.147
See application file for complete search history.

(56) References Cited

U.S. PATENT DOCUMENTS

| | | | | |
|---|---|---|---|---|
| 4,377,298 A | * | 3/1983 | Finn et al. | 280/124.142 |
| 4,491,339 A | * | 1/1985 | Mizumukai et al. | 280/124.154 |
| 4,810,002 A | * | 3/1989 | Kakimoto et al. | 280/124.138 |
| 4,982,977 A | * | 1/1991 | Shimada | 280/86.753 |
| 5,145,204 A | * | 9/1992 | Perkins | 280/124.144 |
| 5,308,032 A | * | 5/1994 | Ohta | 248/230.2 |
| 5,439,244 A | * | 8/1995 | Tomosada et al. | 280/124.139 |
| 5,533,328 A | * | 7/1996 | Zmyslowski et al. | 59/15 |
| 6,161,853 A | * | 12/2000 | Jung | 280/124.136 |
| 6,273,407 B1 | | 8/2001 | Germano | |
| 7,318,505 B2 | | 1/2008 | Muller et al. | |
| 7,793,954 B2 | * | 9/2010 | Kucinski et al. | 280/124.134 |
| 7,997,599 B2 | * | 8/2011 | Zmyslowski et al. | 280/124.134 |

FOREIGN PATENT DOCUMENTS

| | | |
|---|---|---|
| DE | 19939515 A1 | 3/2001 |
| DE | 10318024 A1 | 11/2004 |

* cited by examiner

*Primary Examiner* — Toan To
(74) *Attorney, Agent, or Firm* — Howard & Howard Attorneys PLLC

(57) ABSTRACT

A suspension system of the present invention pivotally supports a wheel of a motor vehicle. An upper control arm and a lower control arm are cooperable with a spindle, which supports the wheel. A vibration damper is cooperable with the upper control arm. A link interconnects the lower control arm and one of the terminal ends of the vibration damper thereby defining a common axis bisecting the link. The vibration damper moves along the common axis to absorb vibration transferred from a road surface and through the wheel.

35 Claims, 5 Drawing Sheets

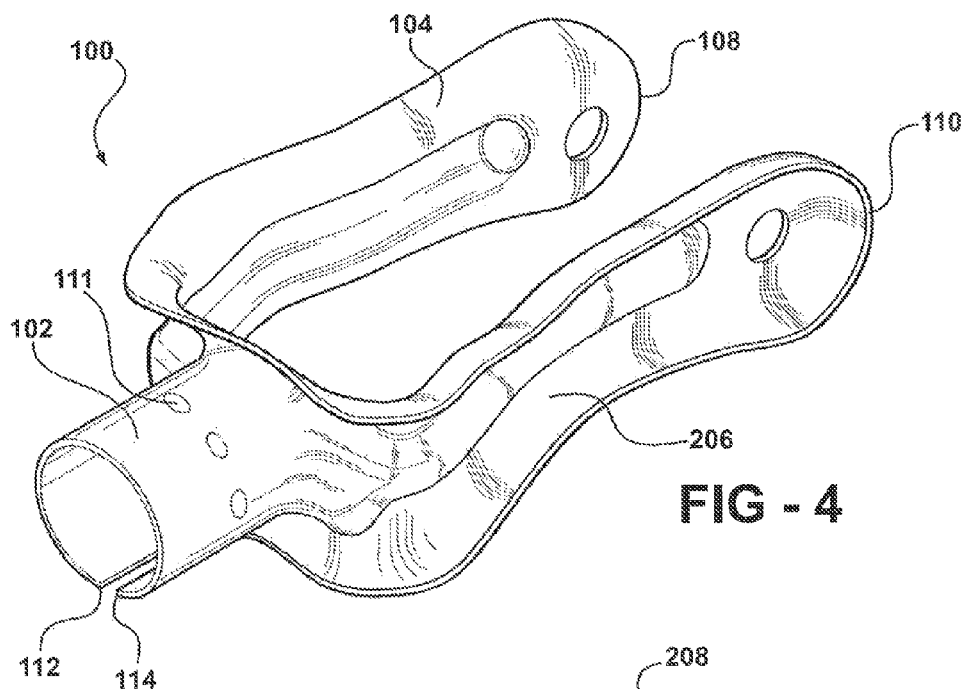
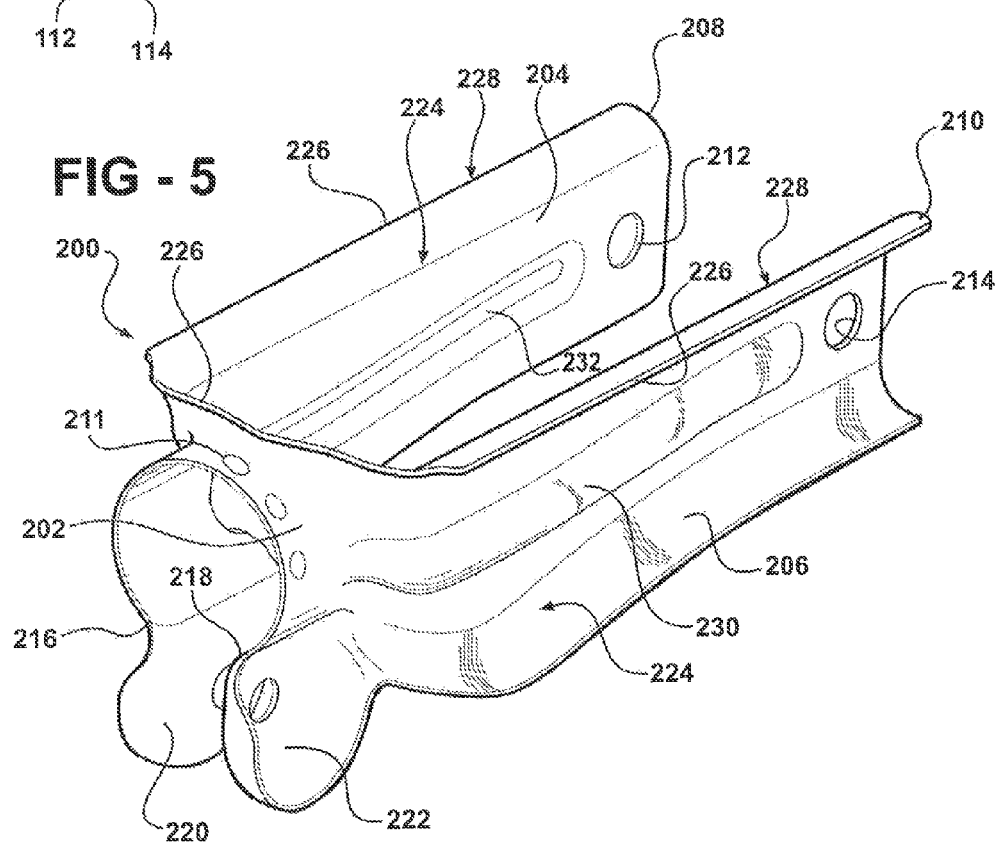

SUSPENSION SYSTEM FOR A VEHICLE

RELATED APPLICATION

This is a U.S. Continuation Pat. application which claims priority to U.S. Continuation patent application Ser. No. 13/188,097, filed on Jul. 21, 2011 which claims priority to U.S. Continuation patent application Ser. No. 12/845,896, filed Jul. 29, 2010, now U.S. Pat. No. 7,997,599 which claims priority to U.S. Non-provisional Patent Application Ser. No. 11/937,249, filed Nov. 8, 2007, now U.S. Pat. No. 7,793,954 which claims priority to U.S. Provisional Patent Application Ser. Nos. 60/952,089, filed Jul. 26, 2007 and 60/945,613 filed Jun. 22, 2007 and incorporated herein by reference in its entirety.

FIELD OF THE INVENTION

The present invention relates a vehicle wheel suspension system and more particularly, to a vehicle wheel suspension incorporating vertical dampener struts for absorbing vibration transferred from a road surface and through the wheel.

BACKGROUND OF THE INVENTION

Like the rest of the systems on automotive vehicles, a suspension system performs a complicated function. The suspension system keeps the wheels of the automotive vehicle lined up with the travel of the automotive vehicle, limits the movement of the body of the automotive vehicle during cornering and when going over bumps, and provides a smooth and comfortable ride for passengers and drivers. Numerous suspension systems are know in the art. A short-long arm (SLA) suspension system has been common on domestic vehicles for many years. In the SLA system, each wheel is independently connected to a frame of the vehicle by a steering knuckle, ball joint assemblies, and upper and lower control arms.

A double-wishbone suspension system presents numerous components such as a frame of the vehicle, a lower arm, an upper arm, a hub for supporting a wheel assembly, and a damper. The upper and lower control arms function as locators to fix a position of the suspension system and its components relative to the automotive vehicle and are attached to the frame with bushings that permit the wheel assemblies to move up and down separately in response to irregularities in the road surface.

The prior art is replete with various suspension systems having at least one yoke or linking element for interconnecting a shock absorber mounted between the vehicle body and a lower arm. These systems are taught by the U.S. Pat. No. 4,377,298 to Finn et al.; U.S. Pat. No. 4,583,759 to Kami et al.; and U.S. Pat. No. 5,375,870 to Smith et al. The U.S. Pat. No. 4,377,298 to Finn et al., for example, disclose a vehicle wheel suspension having a shock absorber mounted between the vehicle body and a lower arm. A clevis or yoke portion formed from a pair of legs and formed from a reverse bend doubled sheet metal form, connected to a neck portion or collar to engage the shock absorber. The clevis taught by the U.S. Pat. No. 4,377,298 to Finn et al., fails to teach or suggest a reinforcing structure defined in the clevis and requires a plurality of members to form the clevis.

The U.S. Pat. No. 4,583,759 to Kami et al., for example, teaches an upper suspension arm support structure having a shock absorber mounted between the vehicle body and a lower arm. The clevis is forged from a metal and has a neck portion to engage the shock absorber and a pair of legs extending to the respective distal ends and connected to the lower arm by a fastener. The clevis of the U.S. Pat. No. 4,583,759 to Kami et al. fails to teach or suggest a reinforcing structure defined in the clevis and requires a plurality of members to form the clevis. Moreover, the clevis of the U.S. Pat. No. 4,583,759 to Kami et al., is forged from a metal thereby negatively impacting the overall weight of the system.

Therefore, an opportunity exists for an improved suspension system and method of manufacturing the same that will reduce the mass of the clevis thereby reducing the effect of vibrations and the resulting noises, add structural integrity to the suspension system, and increase performance of drive line applications at a low cost and a high volume.

SUMMARY OF THE INVENTION

The suspension system of the present invention keeps the wheel assemblies of the automotive vehicle lined up with the travel of the automotive vehicle, limits the movement of the body of the automotive vehicle during cornering and when going over bumps, and provides a smooth and comfortable ride for passengers and drivers. The suspension system presents numerous components such as a frame of the vehicle, a lower control arm, an upper control arm, a hub or a spindle for supporting the wheel assembly, and a vibration damper. The upper control arm and the lower control arm of the suspension system are cooperable with a spindle cooperable with the hub, which defines a rotational axis and supports the wheel assembly. The vibration damper having first and second terminal ends with one of the terminal ends being cooperable with the upper control arm.

A link or clevis has a monolithic construction and a generally uniform thickness. The link interconnects the lower control arm and the second terminal end of the vibration damper. The link and the vibration damper define a common axis bisecting the link and extending in a direction different from the direction of the rotational axis. The vibration damper is movable along the common axis the absorbing vibration transferred from a road surface and through the wheel. The link is stamped from a blank formed from metal, metal alloys, and combination thereof. The link includes a neck portion having a generally circular cross section for receiving the vibration damper and a pair of spaced legs.

A reinforcement rib is deformed into each of the legs thereby preventing the legs from bending as the vibration damper absorbs vibration transferred from the road surface and through the wheel. The reinforcement rib is further deformed into the neck portion tapering away from the distal end to increase strength of the link. The reinforcement rib presents a first width as the reinforcement rib extends from the distal end to the neck portion and a second width as the leg transforms to the neck portion and a third width as the reinforcement rib further tapers onto the neck portion. The neck portion includes terminal edges and a seam extending therebetween. The seam receives a connector to secure the link to the vibration damper. Each of the legs presents a face having opposed peripheral edges extending outwardly from the face and tapering proximate the distal end to present the distal end having a generally flat cross section.

An advantage of the present invention is to provide the improved link for the suspension system that is stamped from a sheet metal presenting a light weight alternative to an iron cast links known in the prior art.

Another advantage of the present invention is to provide an improved link for the suspension system that reduces the mass of the improved link.

Still another advantage of the present invention is to provide an improved link having at least one reinforcement rib deformed into each of the legs of the link thereby preventing the legs from bending as the vibration damper absorbs vibration transferred from the road surface and through the wheel and to provide structural integrity to the link and the entire suspension system.

Still another advantage of the present invention is to provide an improved mounting structure for mounting both right and left suspension assemblies as a unit to the vehicle body.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 illustrates a first alternative embodiment of the inventive link;

FIG. 5 illustrates a second alternative embodiment of the inventive link; and

DETAILED DESCRIPTION OF THE INVENTION

Figure 1:
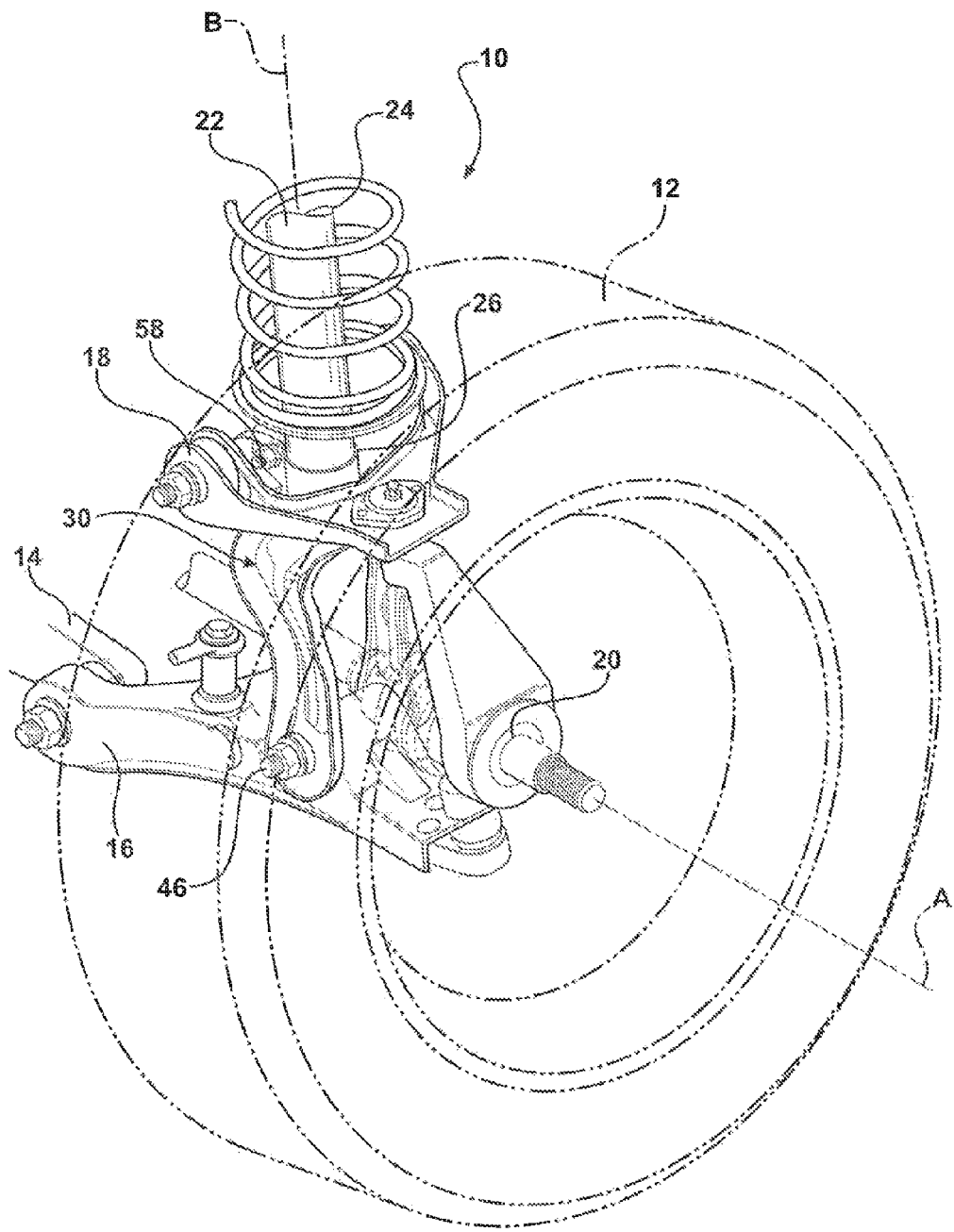
FIG. 1 illustrates a perspective view of a suspension assembly having an upper arm and a lower arm and a link cooperable with a vibration damper and connected to the lower arm.
Figure 2:
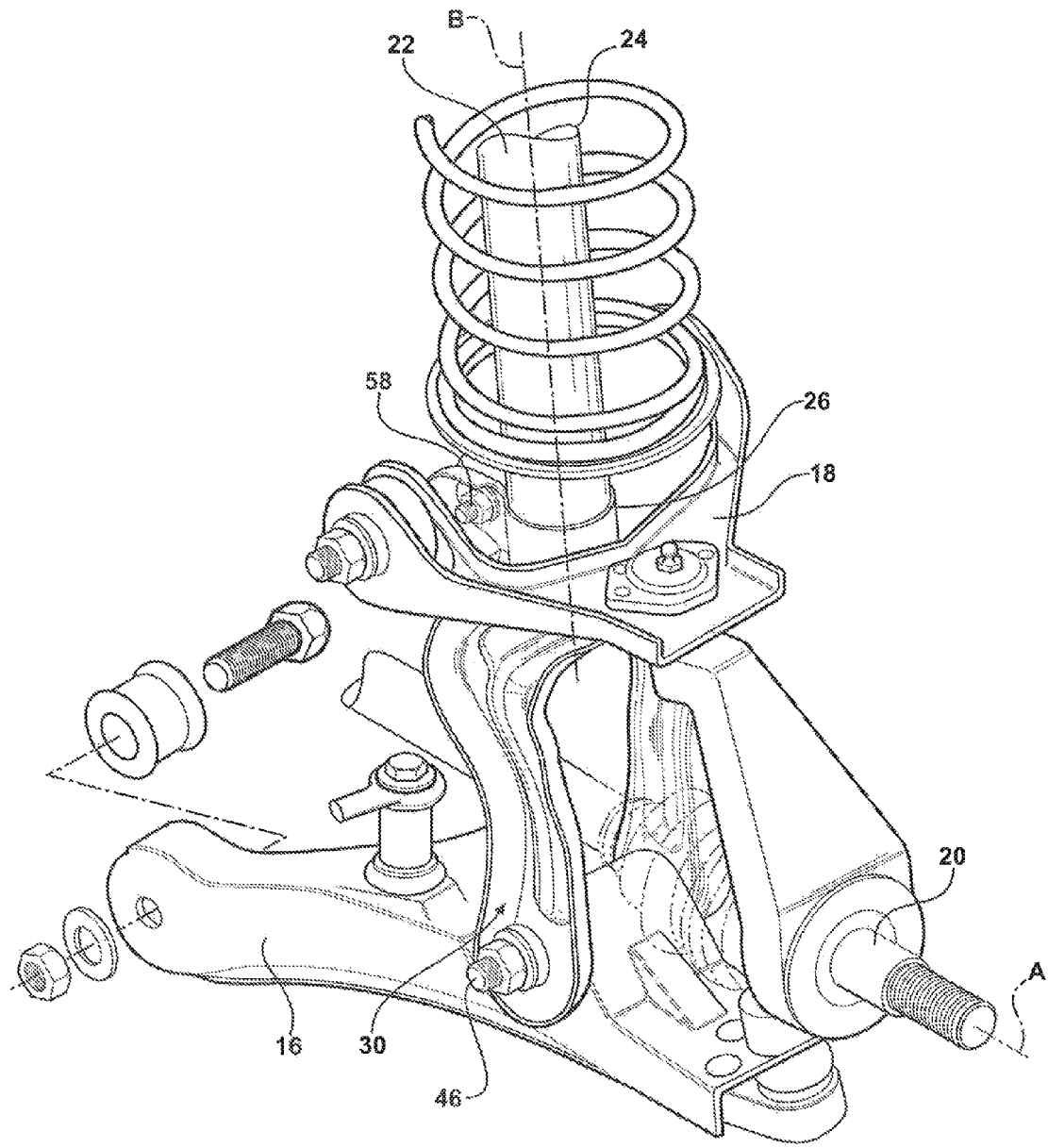
FIG. 2 illustrates a illustrates a perspective and partially exploded view of the suspension assembly of FIG. 1.

Referring to the Figures, wherein like numerals indicate like or corresponding parts, a suspension system of the present invention is generally shown at 10 in FIGS. 1 and 2. The suspension system 10 keeps the wheel assemblies 12 of an automotive vehicle (not shown) lined up with the travel of the automotive vehicle, limits the movement of the body of the automotive vehicle during cornering and when going over bumps, and provides a smooth and comfortable ride for passengers and drivers. The suspension system 10 presents numerous components such as a frame 14 (only partially shown in FIG. 1) of the vehicle, a lower control arm 16, an control upper arm 18, a hub or a spindle 20 for supporting the wheel assembly 12 and defining a rotational axis A, and a vibration damper or strut 22. The upper and lower control arms 18 and 16 function as locators to fix a position of the suspension system 10 and its components relative to the automotive vehicle and are attached to the frame 14 with bushings that permit the wheel assemblies 12 to move up and down separately in response to irregularities in the road surface. Those skilled in the automotive art will appreciate that the suspension system 10 described above and to be further described further below may be a short-long arm (SLA) suspension system has been common on domestic vehicles for many years, a double-wishbone suspension systems, and other suspension systems of the kind without limiting the scope of the present invention.

The vibration damper 22 has first and second terminal ends 24 and 26 with the second terminal end 26 being cooperable with the upper control arm 18. A link or clevis, generally indicated at 30 in FIGS. 1 through 3, interconnects the vibration damper 22 and the lower control arm 16, as best shown in FIG. 2. The link 30 is stamped from a blank of metal, metal alloys, and combination thereof, as the blank goes through a progressive die tool, a line die tool, or a transfer die tool, as described in the provisional application Ser. Nos. 60/945,613, filed Jun. 22, 2007 and 60/952,089 filed Jul. 26, 2007 and incorporated herewith in its entirety.

Figure 3A:
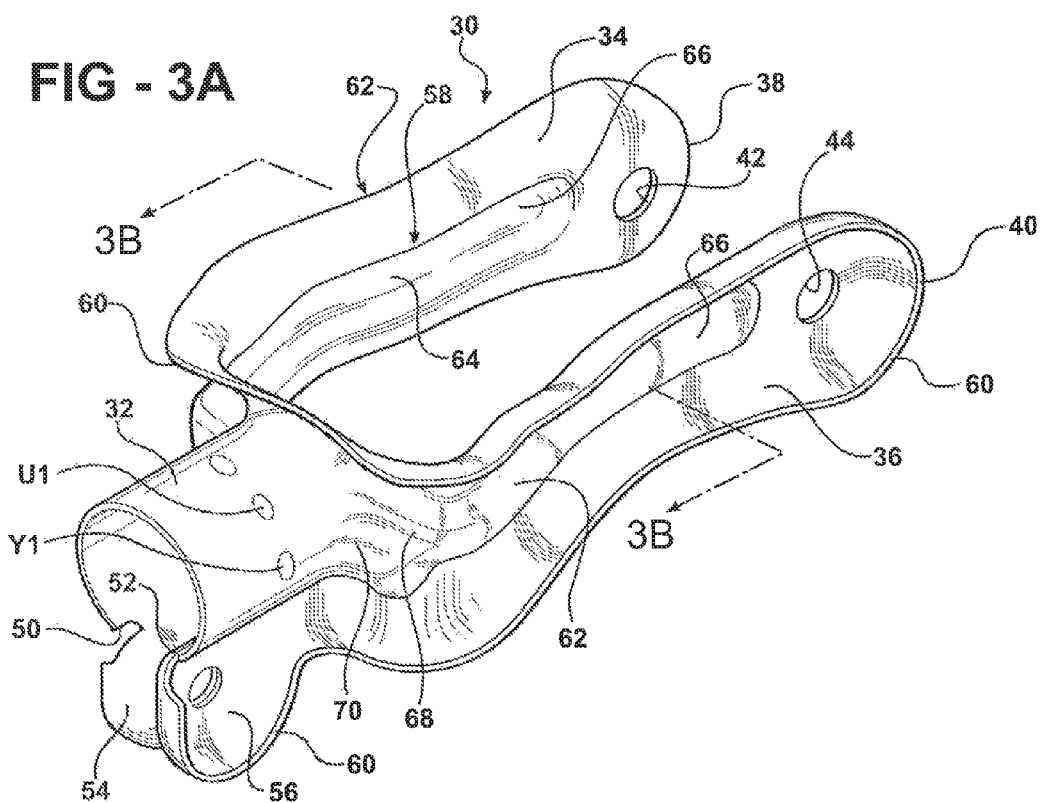
FIG. 3A illustrates the inventive link having a monolithic construction and a generally uniform thickness.
Figure 3B:
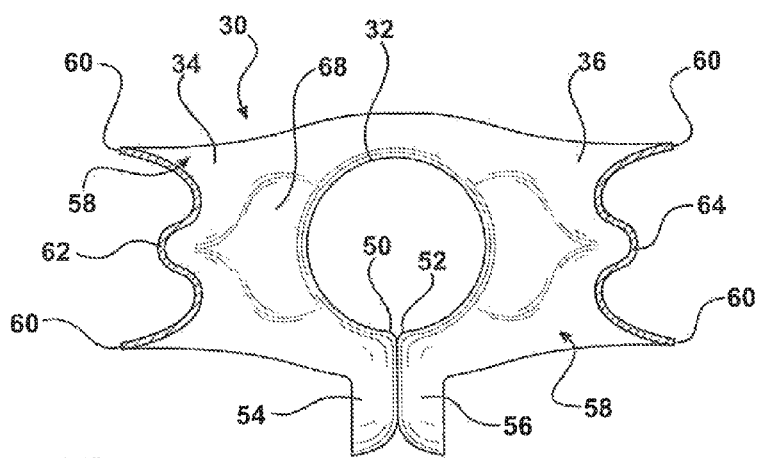
FIG. 3B illustrates the cross sectional view of the link shown in FIG. 3A and taken along lines 3B-3B.

The link 30 presents a monolithic construction and a generally uniform thickness, as best shown in FIG. 3B. The link 30 interconnects the lower control arm 16 and the second terminal end 26 of the vibration damper 22. As best shown in FIG. 2, the link 30 and the vibration damper 22 define a common axis B bisecting the link 30 and extending in a direction different from the direction of the rotational axis A. The vibration damper 22 is movable along the common axis B to absorb vibration transferred from a road surface and through the wheel assembly 12.

Referring now to FIG. 3A, the link 30 is further defined by a neck portion 32 having a circular cross section and a pair of opposing legs 34 and 36 extending from the neck portion 32 to distal ends 38 and 40. A plurality of weld openings 41 are formed peripherally defined in the neck portion 32 to weld the neck portion 32 to the vibration damper 22. Each distal end 38 and 40 defines an opening 42 and 44 to receive a fastener 46 for affixing the link to the lower control arm 16. The neck portion 32 includes terminal edges 50 and 52 and a pair of lips 54 and 56 extending from each of the terminal edges 50 and 52 to receive a connector 58 extending therethrough as the neck portion 32 circumscribes and engages the terminal end of the vibration damper 22, as best shown in FIGS. 1 and 2.

Referring back to FIGS. 3A and 3B, each of the legs 34 and 36 defines a periphery, generally indicated at 58, extending to a common flange 60 for strengthening the link 30. The common flange 60 further extends to surround the pair of lips 54 and 56. The flange 60 becomes tapered proximate to the distal end 38 and 40 of each of the legs 34 and 36 (not shown). Alternatively, as shown in FIG. 3A and without limiting the scope of the present invention, the flange 60 partially circumscribes the distal end 38 and 40. The periphery 58 defines a generally curvelinear geometry 62 as shown in FIG. 5. The periphery 58 defines a generally linear geometry (not shown).

A pair of reinforcement ribs 62 and 64 is formed into each leg 34 and 36. The ribs 62 and 64 further extend into neck portion 32 thereby tapering in an opposite direction from the distal ends of each of the legs 34 and 36 to increase strength of the link 30. The reinforcement ribs 62 and 64 bridge the neck portion 32 and the legs 34 and 36. The reinforcement ribs 62 and 64 present a first width 66 as the reinforcement ribs 62 and 64 extends from the distal end to the neck portion 32 and a second width 68 as each of the legs 34 and 36 transforms to the neck portion 32 and a third width 70 as the reinforcement ribs 62 and 64 further taper onto the neck portion 32.

FIG. 4 illustrates a first alternative embodiment of the inventive link, generally shown at 100. The numeral references will be reflected accordingly to distinguish the first alternative embodiment illustrated in FIG. 4 from the embodiment of the link as shown in FIG. 3A without limiting the scope of the present invention. The link 100 is further defined by a neck portion 102 having a circular cross section and a pair of opposing legs 104 and 106 extending from the neck portion 102 to distal ends 108 and 110. A plurality of weld openings 111 are formed peripherally defined in the neck portion 102 to weld the neck portion 102 to connect the neck portion 102 to the vibration damper 22. The neck portion 102 includes terminal edges 112 and 114 spaced from one another thereby forming a seam. All other parts of the link 100 are identical to the link 30 as illustrated in FIGS. 3A and 3B.

FIG. 5 illustrates a second alternative embodiment of the inventive link generally indicated at 200. The numeral references will be reflected accordingly to distinguish the second alternative embodiment illustrated in FIG. 5 from the embodiment of the link as shown in FIGS. 3A and 4 without limiting the scope of the present invention. Referring now to FIG. 5, the link 200 is further defined by a neck portion 202 having a circular cross section and a pair of opposing legs 204 and 206 extending from the neck portion 202 to distal ends 208 and 210. A plurality of weld openings 211 are formed peripherally defined in the neck portion 202 to connect the neck portion 202 to the vibration damper 22. Each distal end 208 and 210 defines an opening 212 and 214 to receive a fastener 46 for affixing the link to the lower control arm 16. The neck portion 202 includes terminal edges 216 and 218 and a pair of lips 220 and 222 extending from each of the terminal edges 216 and 218 to receive a connector 58 extending therethrough as the neck portion 202 circumscribes and engages the terminal end of the vibration damper 22, as best shown in FIG. 2.

Referring back to FIG. 5, each of the legs 204 and 206 defines a periphery, generally indicated at 224, extending to a common flange 226 for strengthening the link 200. The common flange 226 further extends to surround the pair of lips 220 and 222. The periphery 224 defines a generally linear geometry 228. A pair of reinforcement ribs 230 and 232 is formed into each leg 204 and 206. The ribs 230 and 232 further extend into neck portion 202 thereby tapering in an opposite direction from the distal ends of each of the legs 204 and 206 to increase strength of the link 200. The reinforcement ribs 230 and 232 bridges the neck portion 202 and the legs 204 and 206. The reinforcement ribs 230 and 232 present a uniform width or a variable width.

Figure 6:
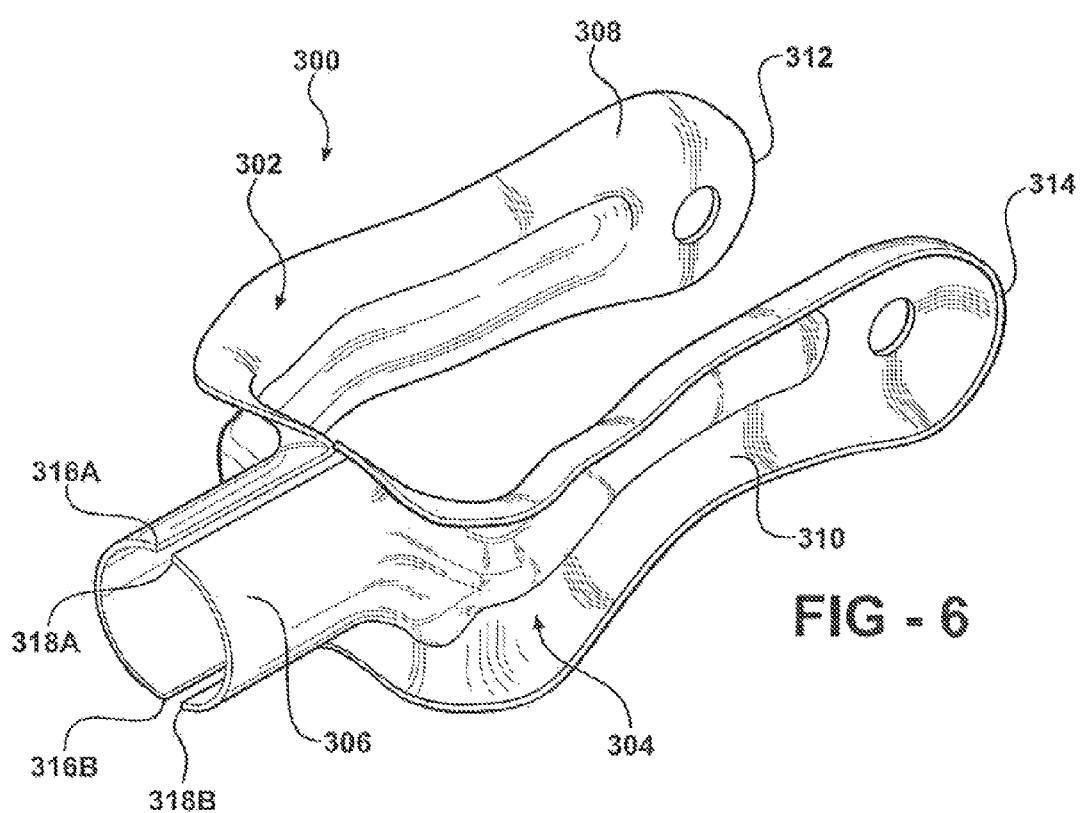
FIG. 6 illustrates a third alternative embodiment of the inventive link.

FIG. 6 illustrates a third alternative embodiment of the inventive link, generally shown at 300. The numeral references will be reflected accordingly to distinguish the first alternative embodiment illustrated in FIG. 4 from the embodiment of the link as shown in FIG. 3A without limiting the scope of the present invention. The link 300 is formed from two parts, generally indicated at 302 and 304, when combined forming a neck portion 306 having a circular cross section and a pair of opposing legs 308 and 310 extending from the neck portion 306 to distal ends 312 and 314. A plurality of weld openings 315 are formed peripherally defined in the neck portion 306 to connect the neck portion 306 to the vibration damper 22. The neck portion 306 includes terminal edges 316 A-B and 318 A-B spaced from one another thereby forming a seam. As the parts 302 and 304 circumscribe the terminal end 26 of the vibration damper 22, the parts 302 and 304 are welded thereto. All other parts of the link 300 are identical to the link 30 as illustrated in FIGS. 3A and 3B.

The suspension system 10 of the present invention provides numerous advantages over the prior art systems, such as the systems taught by the U.S. Pat. No. 4,377,298 to Finn et al.; U.S. Pat. No. 4,583,759 to Kami et al.; and U.S. Pat. No. 5,375,870 to Smith et al. The improved links 30, 100, 200, and 300 is stamped from a sheet metal presenting a light weight alternative to an iron cast links known in the prior art. Another advantage of the improved link for the suspension system 10 relates to reduction in the mass of the link. The improved link 30, 100, 200, and 300 has at least one reinforcement rib deformed into each of the legs of the link thereby preventing the legs from bending as the vibration damper absorbs vibration transferred from the road surface and through the wheel and to provide structural integrity to the link and the entire suspension system 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A strut assembly for a motor vehicle suspension, comprising:
a generally U-shaped member having a middle portion and a pair of legs extending from said middle portion wherein said U-shaped member is formed from a metal blank defining a monolithic construction with generally uniform thickness throughout and including at least one of a flange and a rib extending along at least a portion of said legs thereby strengthening said U-shaped member to adequately sustain loads in said motor vehicle suspension;
a housing of a vibration damper connected to said middle portion extending in a direction away from said legs; and
a vibration damper disposed in said vibration damper housing.

2. The strut assembly of claim 1 further comprising:
a reinforcing flange extending along said middle portion.

3. The strut assembly of claim 1 wherein said middle portion further comprises a neck portion.

4. The strut assembly of claim 3 wherein said neck portion is tubular.

5. The strut assembly of claim 3 wherein said neck portion receives said housing.

6. A strut assembly for a motor vehicle suspension, comprising:
a generally U-shaped part having a middle portion and a pair of legs extending from said middle portion wherein said U-shaped part is metal and has a substantially uniform thickness throughout wherein at least one of a reinforcing flange and a rib extends along at least a portion of said legs;
a housing of a vibration damper connected to said middle portion and extending in a direction away from said legs; and
a vibration damper disposed in said vibration damper housing.

7. The strut assembly of claim 6 wherein said U-shaped part is cut from a sheet of metal before being formed into said U-shaped member.

8. The strut assembly of claim 6 further comprising:
a second reinforcing flange extending along said middle portion.

9. The strut assembly of claim 6 wherein the at least one of said reinforcing flange and rib extends along said middle portion.

10. The strut assembly of claim 6 wherein said middle portion includes a neck portion for connecting to said housing.

11. The strut assembly of claim 10 wherein said neck portion is tubular.

12. A strut assembly for a motor vehicle suspension, comprising:
a generally U-shaped part having a middle portion and a pair of legs extending from said middle portion wherein a reinforcing portion including at least one of a rib and a flange extends along at least a portion of said legs and wherein said U-shaped part is formed from a metal blank of generally uniform thickness throughout; and a housing of a vibration damper connected on an opposite side of said middle portion from said legs.

13. The strut assembly of claim 12 further comprising:
a vibration damper disposed in said vibration damper housing.

14. The strut assembly of claim 12 further comprising:
a reinforcing flange extending along said middle portion.

15. The strut assembly of claim 12 wherein the at least one of said reinforcing rib and flange extends along said middle portion.

16. The strut assembly of claim 12 wherein said middle portion includes a neck portion for connecting to said housing.

17. The strut assembly of claim 16 wherein said neck portion is tubular.

18. A link for a motor vehicle suspension system adapted to sustain loads in said suspension system, comprising:
a generally U-shaped part having a middle portion and a pair of legs extending from said middle portion wherein at least one of a reinforcing flange and a rib extends along at least a portion of said legs wherein said U-shaped part is formed from metal of generally uniform thickness throughout.

19. The link of claim 18 wherein said middle portion is adapted to connect with a vibration damper.

20. The link of claim 18 wherein said middle portion includes a neck portion.

21. The link of claim 20 wherein said neck portion is tubular.

22. The link of claim 18 wherein said U-shaped part is formed from a sheet of metal.

23. The link of claim 18, further comprising a flange extending along said middle portion.

24. A strut assembly for a motor vehicle suspension, comprising:
a generally U-shaped member having a middle segment and a pair of legs extending from said middle segment wherein said U-shaped member is formed from a metal blank defining a monolithic construction with generally uniform thickness throughout and including a flange portion extending along an edge of said legs and said middle segment thereby strengthening said U-shaped member to adequately sustain loads in said motor vehicle suspension;
a housing of a vibration damper connected to said middle segment extending in a direction away from said legs; and
a vibration damper disposed in said vibration damper housing.

25. The strut assembly of claim 24 further comprising:
a pair of reinforcing ribs inward from an edge of the U-shaped member wherein said reinforcing ribs extend along at least a portion of each of said legs.

26. The strut assembly of claim 24 wherein said middle segment includes a center portion for connecting to said housing of said vibration damper wherein the metal of said center portion is formed to support said housing.

27. The strut assembly of claim 26 wherein said center portion is tubular.

28. The strut assembly of claim 24 wherein said middle segment further comprises a neck portion for receiving said housing.

29. The strut assembly of claim 24 wherein said flange portion extends from each of said legs onto said middle segment.

30. The strut assembly of claim 24 wherein a reinforcing rib extends along a portion of the legs, inward from an edge of the legs.

31. A strut assembly for a motor vehicle suspension, comprising:
a generally U-shaped member having a middle segment and a pair of legs extending from said middle segment wherein said U-shaped member is formed from a metal blank defining a monolithic construction with generally uniform thickness throughout wherein said middle segment includes a neck portion and wherein said U-shaped member includes a flange deformed from an edge of said legs and said middle segment thereby strengthening said U-shaped member to adequately sustain loads in said motor vehicle suspension;
a housing of a vibration damper connected to said neck portion extending in a direction away from said legs; and
a vibration damper disposed in said vibration damper housing.

32. The strut assembly of claim 31 wherein said neck portion is tubular.

33. The strut assembly of claim 31 further comprising:
a reinforcing rib inward from an edge of the U-shaped member and extending along at least a portion of each of said legs.

34. The strut assembly of claim 31 wherein said neck portion is tubular.

35. The strut assembly of claim 31 wherein said flange extends from each of said legs onto said middle segment.

* * * * *